United States Patent [19]

Barton

[11] Patent Number: 4,459,628
[45] Date of Patent: Jul. 10, 1984

[54] DISK CARTRIDGE

[75] Inventor: Richard E. Barton, Scituate, Mass.

[73] Assignee: Cipher Data Products, Inc., San Diego, Calif.

[21] Appl. No.: 369,564

[22] Filed: Apr. 19, 1982

[51] Int. Cl.³ .................. G11B 23/02; G11B 5/12
[52] U.S. Cl. ........................ 360/133; 360/97; 346/137
[58] Field of Search ........... 360/132, 133, 135, 97–99; 206/444; 346/137; 358/128; 369/261, 270

[56] References Cited

U.S. PATENT DOCUMENTS

| | | | |
|---|---|---|---|
| 3,465,875 | 9/1969 | McKelvey, Jr. | 206/62 |
| 3,526,884 | 9/1970 | Buslik et al. | 340/174.1 |
| 3,566,381 | 2/1971 | Buslik et al. | 340/174.1 |
| 3,882,701 | 5/1975 | Wirth | 70/63 |
| 3,899,794 | 8/1975 | Brown, Jr. | 360/133 |
| 3,938,192 | 2/1976 | Caletti | 360/133 |
| 3,947,893 | 3/1976 | Hall, Sr. | 360/133 |
| 3,973,273 | 8/1976 | Lissner et al. | 360/133 |
| 4,071,862 | 1/1978 | Lathrop, Jr. et al. | 360/97 |
| 4,078,246 | 3/1978 | Berthoux et al. | 360/133 |
| 4,084,200 | 4/1978 | Adair et al. | 360/133 |
| 4,106,066 | 8/1978 | Kudo | 360/133 |
| 4,112,471 | 9/1978 | Pollard et al. | 360/98 |
| 4,120,012 | 10/1978 | Bowers | 360/133 |
| 4,177,491 | 12/1979 | Jahn | 360/135 |
| 4,184,184 | 1/1980 | Hedin et al. | 360/133 |
| 4,185,313 | 1/1980 | Green et al. | 360/133 |

Primary Examiner—John H. Wolff
Attorney, Agent, or Firm—Brown & Martin

[57] ABSTRACT

A disk cartridge having a housing in which a substantially rigid disk is completely enclosed, the disk having a nub which is accessible through an opening in the housing for engagement by a rotatable drive spindle. The housing has an opening for receiving a read/write head to apply or pick off data from the magnetically permeable surface of the disk. The head receiving opening is normally closed by a door which is opened by a cam when the cartridge is inserted in a drive unit. When not in use, the disk hub is held against the interior of the hub opening to seal the cartridge against contamination. When the cartridge is inserted in a drive unit, the drive spindle is guided into a self-centering socket in the hub and lifts the hub clear of the opening for free rotation of the disk.

10 Claims, 9 Drawing Figures

DISK CARTRIDGE

BACKGROUND OF THE INVENTION

The present invention relates broadly to the field of digital data recording and retrieving from a magnetic disk and particularly to a cartridge for use in a digital magnetic disk drive for storing and retrieving data.

Disk storage devices having been used in digital computer systems as a means to provide random access bulk data storage. Not infrequently, such disk drives are designed with a recording media disk permanently mounted on a spindle and rotated by a motor. Read/write heads are mounted to move radially with respect to the disk, thereby permitting the drive to either store or retrieve data from tracks on the storage media. These tracks are disposed in concentric ring-like regions on the surface of the disk.

Fixed disk storage media of the type described are usually quite expensive but do provide a great deal of random access storage. A disadvantage of such drives, however, is that the storage media is not removable, so the storage space available becomes dedicated to certain tasks on the system to which the drive is attached and, therefore, unavailable for other uses. Such drives also require backup capability to protect against the various types of failures which may occur.

To solve the problem of disk dedication, removable media disks have been developed. In some such devices, a plurality of disks are affixed to a shaft. The disks, prior to being mounted in the drive, are frequently housed in a dust-proof case. When in the drive, the disks are surrounded by a drive closure which keeps out as much airborne contamination as possible. Disk packs of this sort have usually been quite large in storage size and also quite expensive, although they have made available a way to provide changeable media for large capacity disk storage devices.

There has been a disk pack sold by IBM Corporation under the designation number 3336. That disk pack has an open bottom and axially disposed, radially flexing members used for centering with respect to the drive spindle.

In an effort to reduce the cost of disk storage devices, interchangeable flexible media disk drives (floppy disk) have been developed. While use of such devices with interchangeable flexible storage media has reduced the cost of bulk storage for small systems, the reliability due to wear and contamination is considerably lower than that for the rigid disk drives. Disk centering is also a problem. In addition, the amount of storage available for such flexible disk drives is small compared to the other systems described earlier.

An approach for increasing the storage capacity and overcoming the reliability problems is the so called Winchester drive. One of the first such drives developed had an interchangeable cartridge in which heads and the disks were removable as a unit. In use, however, there were few cartridges used in addition to the cartridge sold with the drive so later drives were developed using Winchester technology which did not have removable storage media. This approach does suffer from the same defect as the first mentioned drive, namely, that the storage area of the disk becomes dedicated and no longer available for other uses.

As is recognized by those of skill in the art, there is a need to backup all types of disk storage devices for various reasons, such as to protect from system failures, software failures, etc. One approach to solving the backup problem is to use another disk. Using another disk for backup purposes, however, is not cost effective, even though it is an easy way to provide the necessary backup. Another backup approach is to use a tape system. Using a tape system as a backup is less expensive than using another disk, but the speed of such systems is not generally compatible with a disk, so tape backup is not the easiest to implement and is more costly than is desirable.

SUMMARY OF THE INVENTION

To overcome the above problems, a disk cartridge is provided having a housing completely enclosing a substantially rigid or hard disk on which a magnetically recordable and readable surface is deposited. The housing enclosing the disk has an opening on one side thereof to permit a drive spindle to enter and engage a spindle attachment which includes means for centering the disk on the spindle. The housing also has an opening to receive a cam which is attached to the drive and designed to be inserted into an opening in the cartridge. When inserted into the cartridge opening, the cam engages a cam follower which causes a door to open, allowing a read/write head to be inserted into the cartridge, thereby allowing data to be read from or be recorded onto the magnetic media.

It is therefore a primary objective of the present invention to provide an interchangeable disk cartridge for use in disk drives having a capacity comparable to that of a dedicated disk in order to provide an effective changeable media for backup or other reasons.

It is a further objective of the invention to provide a disk cartridge which is designed to keep contamination to a minimum while removed from the drive and yet permit easy access to the storage media when inserted into the drive.

It is still a further objective of the invention to provide a disk cartridge having a substantially rigid disk which is automatically and accurately centered on the drive spindle when the cartridge is loaded into a drive.

It is yet another objective of the invention to provide a disk cartridge which, when inserted into a drive, permits flow of filtered air through the cartridge and which, when outside the drive, prevents air circulation into the cartridge.

BRIEF DESCRIPTION OF THE DRAWING

The foregoing and other objects, advantages and features of the present invention are described below in greater detail in connection with the attached drawings which form a part of the disclosure wherein.

DETAILED DESCRIPTION OF THE INVENTION

Figure 1:
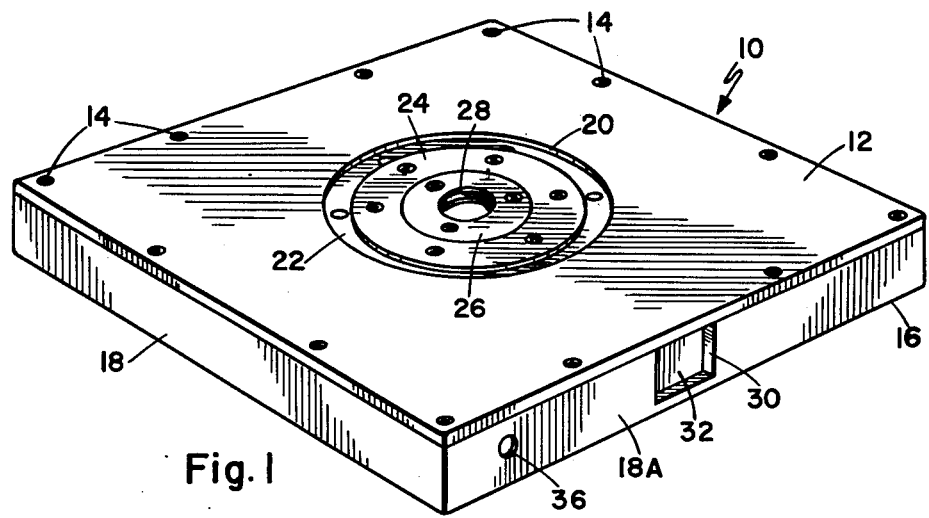
FIG. 1 is a perspective view of an assembled cartridge according to the invention, the underside being illustrated.
Figure 2:
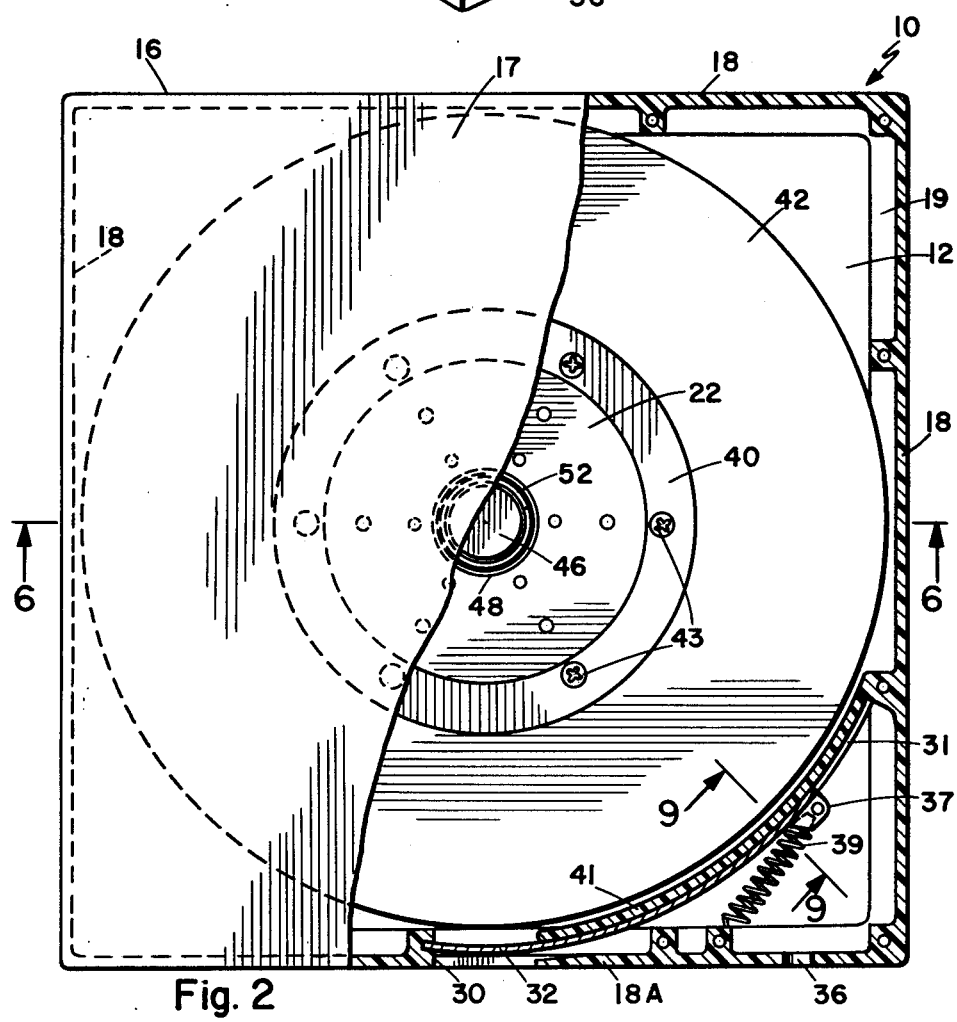
FIG. 2 is an enlarged top plan view of the cartridge with a portion of the housing cut away.

The disk cartridge 10 according to the present invention is illustrated in FIG. 1 with its bottom side facing upwardly. The bottom 12 of the cartridge comprises a suitably planar panel, preferably made of a suitably rigid plastic such as ABS or other similar material. The bottom 12 is attached by a plurality of screws 14 to the cartridge top 16 which is preferably made of the same material as the bottom 12. The top 16 generally comprises a shallow box-like housing with a top wall 17 (FIG. 2) and four vertically disposed side walls 18. The cartridge bottom 12 resets on the side walls 18 and the screws 14 thread into appropriate sockets in the cartridge top 16 to thereby affix the bottom 12 to the top 16. A peripheral rib 19 on the inside face of bottom 12 fits closely inside the walls 18 and holds the bottom in alignment.

The cartridge bottom 12 (FIG. 1) has a centrally located drive opening 20 through which is seen one face of a hub comprising a base 22 which is preferably made of aluminum or other suitably strong, light, non-magnetic material. Mounted on the exposed base 22 is a drive ring 24 which is made of a magnetically permeable material suitable for engaging the magnetic drive mounted to the spindle of a drive assembly, which is described hereinafter in greater detail. Disposed inside the drive ring 24 is a guide 26 which is used to assist in centering the disk with respect to the nose of the spindle in the drive which accepts the cartridge.

Figure 6:
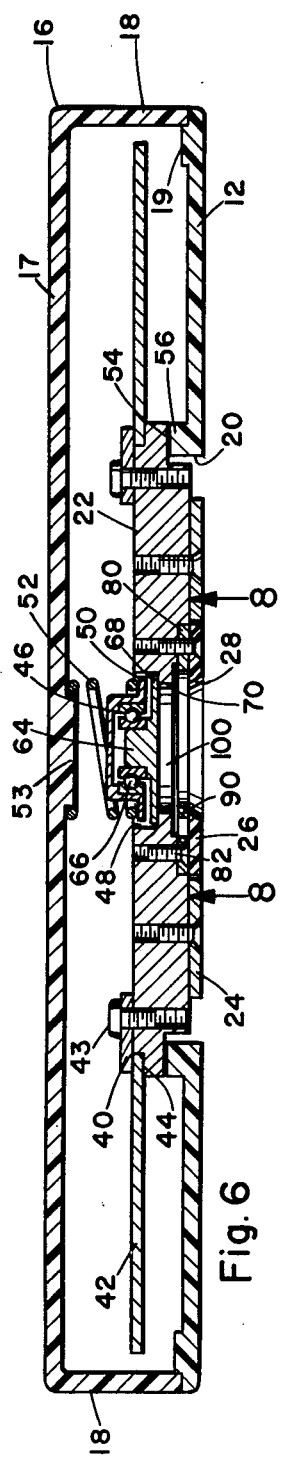
FIG. 6 is an enlarged sectional view taken on lines 6—6 of FIG. 2.

An opening 28 in the center of the guide has an inner convergent surface, as illustrated in FIG. 6, which is preferably angled at about 20 degrees to the rotation axis through the drive spindle 58 (FIG. 7) and is provided for receiving the tapered nose 59 of the spindle from the disk drive into which the cartridge is inserted. Contact of the tapered nose 59 with the conical surface serves to guide the spindle 58 into the central opening 28 in which a precise alignment mechanism, described later, is located.

Figure 3:
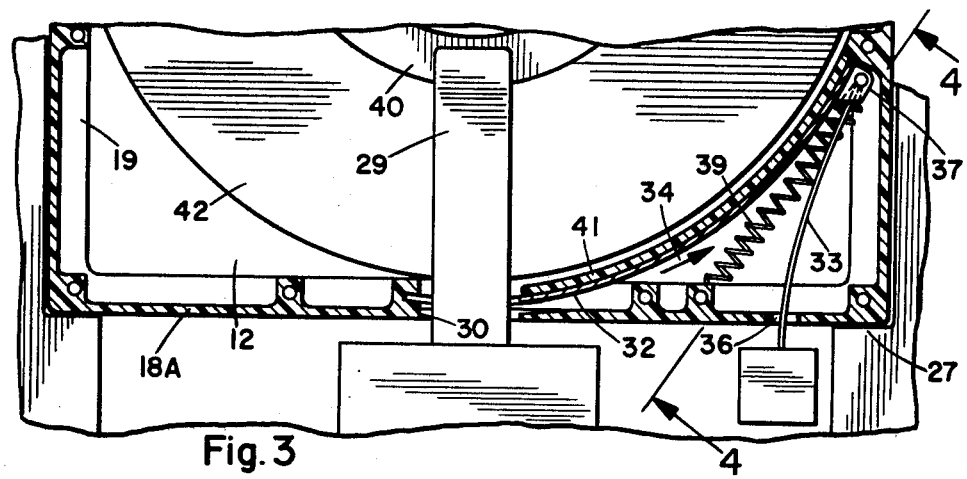
FIG. 3 is a view similar to a portion of FIG. 2, with the cartridge inserted into a utilization apparatus.
Figure 4:
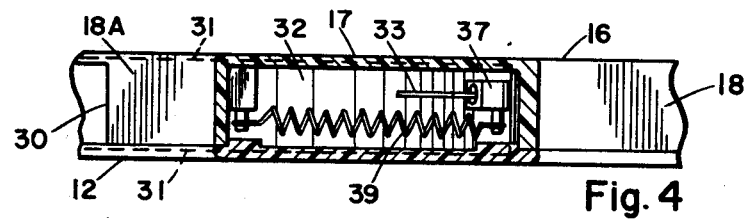
FIG. 4 is a sectional view taken on line 4—4 of FIG. 3.
Figure 5:
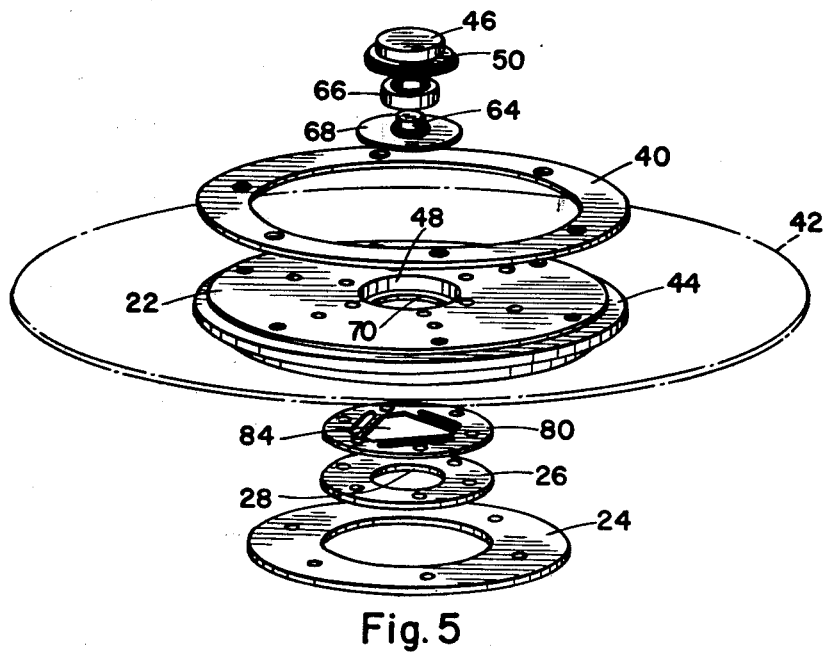
FIG. 5 is an exploded perspective view of the disk and hub assembly.
Figure 9:
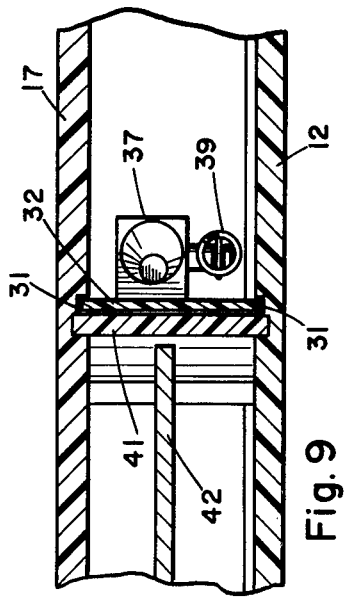
FIG. 9 is an enlarged sectional view taken on line 9—9 of FIG. 2.

The cartridge also includes an opening 30 (FIG. 2) in one side wall 18A which, as shown, is blocked by a slidable door 32. The slidable door can be operated to clear the opening 30, as shown in FIG. 3, allowing magnetic heads from the disk drive into which the cartridge is inserted to enter the interior of the cartridge, thereby permitting access to the magnetically recordable media. The door 32 is opened by a separate actuator cam 33 which is part of the disk drive into which the cartridge is inserted and which, as the cartridge is inserted into the drive, enters a cam receiving opening 36 in wall 18A and contacts a cam follower 37 (FIG. 9) located on one end of the slidable door 32, as in FIG. 3. The drive includes suitable receiver structure 27 (FIG. 3) to hold the cartridge in alignment, the magnetic heads 29 and cam 33 being mounted on the receiver structure. As the cam follower 37 is displaced away from the opening 36, the door 32 slides to the right, as indicated by the arrow 34 to the open position illustrated in FIG. 3. When the cartridge is withdrawn from the disk drive assembly, a return spring 39 within the cartridge causes the door to move in a direction opposite to the arrow 34, thereby closing the opening 30 and preventing contamination from entering the cartridge. Door 32 slides in grooved tracks 31 in the bottom 12 and top wall 17, against the outside of an arcuate baffle 41 which is fixed between the bottom and top wall. The baffle 41 prevents contamination from entering the interior of the cartridge through cam opening 36. As illustrated, the cam is a resilient wire member which seats in a socket in follower 37 and can bend to accommodate the door motion.

Disposed within the cartridge is a substantially rigid or hard disk 42 (FIGS. 2, 6 and 7) which is secured on the top side of the base 22 by a clamping ring 40. The clamping ring 40 is held by screws 43 to clamp the disk 42 into a rabbet 44 disposed around the circumference of the upper surface of the base 22. The surface of the disk 42 is coated with a magnetically recordable and readable media of the type well known in the field of magnetic disk recording devices.

Figure 7:
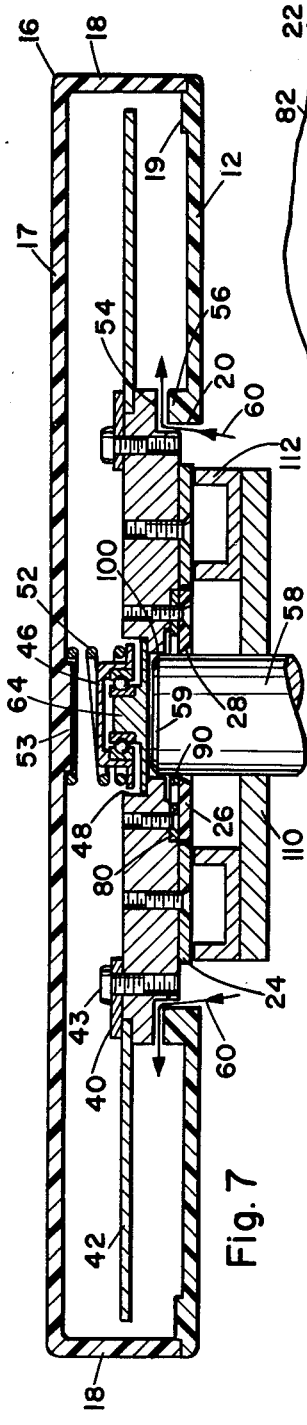
FIG. 7 is a sectional view similar to FIG. 6, but with a disk drive mechanism engaged with the cartridge.

As illustrated in FIG. 6, a mount member 46 is positioned in the centrally located opening 48 in the upper surface of the base 22. The mount member 46 provides a radially extending surface 50 for receiving the lowermost end of a coiled compression spring 52, the upper end of the spring being seated on a boss 53 on the inside of top wall 17. The mount member 46 is spaced from a pilot member 64 by a bearing 66. The pilot member 64 has a radially extending portion 68 which bears against a lip portion 70 at the bottom of opening 48. Accordingly, the force of the coiled spring 52 is transmitted to the mount member 46, through the bearing 66 to the pilot member 64 and then to the base 22. The purpose of this spring 52 is to force the base 22 toward the bottom of the cartridge 12 thereby causing the lower surface 54 of the base 22 to bear against the raised lip 56 around opening 20 of the bottom 12 when the cartridge is not engaged by a spindle, as in FIG. 6, thereby preventing contamination from entering the cartridge. When the cartridge is engaged by a spindle 58, however, as is illustrated in FIG. 7, the surfaces 54 and lip 56 are separated from each other, thereby allowing filtered air to be introduced into the cartridge in a direction illustrated by the arrow 60. The filtered air can then flow within the cartridge and ultimately exit through the opening 30.

Figure 8:
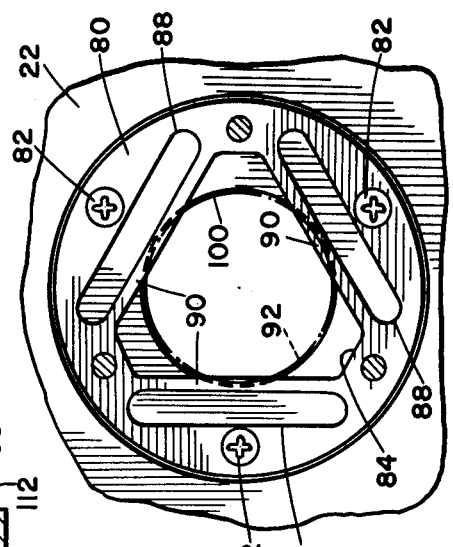
FIG. 8 is an enlarged sectional view taken on lines 8—8 of FIG. 6.

Referring now to FIG. 8, the under surface of the disk is illustrated with the guide 26 removed, thereby revealing a flexure member 80 which is inset in the base 22. The flexure member 80 is preferably made of resilient material such as phosphor bronze or the like and is fixed to the base 22 by a plurality of screws 82. The flexure member has a generally equilateral triangle-shaped opening, indicated at 84, which is disposed symmetrically around the rotational axis of the disk. Other openings are usable provided they have straight, equal length sides such as a square, a pentagon, a hexagon, etc. Disposed parallel to the sides of the generally triangular opening 84 are three slots 88 which are spaced outwardly from the opening so that a flexing portion 90 is formed between each slot 88 and the adjacent side of the opening 84 in the form of flexure elements overlying the edge of a spindle socket in hub 100 (FIG. 8). When the disk is engaged by guiding into the spindle socket a spindle having a circumference as illustrated by the dotted circle 92 and having an axis coextensive with the rotational axis of the disk, the flexing portions 90 are flexed outwardly so that the innermost edges of these portions 90 flexibly contact and lightly grip the outer surface of the spindle as shown in FIG. 7. Due to the symmetrical geometry of the flexure member 80, the base 22 then becomes centered with respect to the rotation axis 86 of the spindle, so that precise radial centering of the disk is achieved with the rotational axes of the disk and spindle aligned. As the flexure member 80 becomes worn, it will still center the disk 42 with respect to the spindle 58.

As illustrated in FIG. 7, the spindle 58 of the drive unit has a support plate 110 fixed thereon perpendicular to the spindle axis. Disposed on the upper surface of the support plate 110 is a drive magnet 112, which engages the drive ring 24 with sufficient strength to assure that there is no slippage between the ring 24 and the magnet 112 when the spindle 58 is turned by a drive motor (not shown). In this manner, the speed of rotation of the spindle 58 is exactly the same as the speed of rotation of the disk including the base 22. A central socket 100 is provided in the base 22, and this socket has sufficient depth so that when the cartridge is engaged by spindle 58, the top of the spindle is spaced from the pilot 64 to ensure proper contact of the magnet with the drive ring. The magnet 112 also serves to position the disk 42 in a plane which is perpendicular to the rotation axis of the spindle 58 while the flexure member 80, as previously noted, centers the disk 42 for rotation about the rotation axis of the spindle 58.

It will be clear from the foregoing discussion that the disk cartridge, according to the present invention, has been designed to provide an assembly which, when it is disconnected from a disk drive, is closed from exterior contamination. Upon inserting the cartridge into the drive, however, a cam serves to open a slidable door, thereby permitting access to the disk 42 upon which a magnetically readable and recordable surface has been deposited. In addition, on inserting the cartridge into the drive, a drive spindle 58 is forced into engagement with the disk within the cartridge so that the surface 54 of the base 22 no longer rests on the lip 56 of the cartridge bottom 12. In this manner, the disk assembly within the cartridge is free to be driven in rotary motion by the spindle 58. The disk is centered on the spindle 58 by the flexure means located symmetrically with respect to the rotation axis of spindle 58.

On withdrawal of the spindle 58 from engagement with the disk within the cartridge, the spring 52 forces against the mount 46 so as to drive the surface 54 of the base 22 again into engagement with the surface 56 on the cartridge bottom 12, thereby closing the cartridge from external contamination.

While the foregoing discussion has been primarily directed to a disk cartridge and a means for driving same, as illustrated in the drawings, those of skill in the art will readily recognize that various modifications may be made to the assembly. For example, the magnet 112 can be a complete ring around the circumference of the member 110, or discrete U-shaped magnets. Indeed, other alternative drive mechanisms including mechanical coupling means between the member 110 and the member 24 can be employed in place of the drive transmitting mechanism illustrated and discussed. Also, a different type of cam would be used to suit the particular drive unit and the manner of inserting the cartridge. These and other modifications may readily be made without departing from the spirit and scope of the present invention as defined in the following claims.

I claim:

1. A disk cartridge, comprising:
   a substantially rigid disk having a magnetically recordable and readable surface;
   a hub on which said disk is secured for rotation about a central axis perpendicular to the plane of the disk, the hub having a face with an axial socket for receiving a drive spindle;
   a housing in which said disk is completely enclosed, the housing having an opening through which the face of said hub is accessible for engagement by a rotatable drive spindle; and
   said hub having a self-centering means symmetrically engageable with a drive spindle for radially centering the disk with the spindle, including a flexure member secured over and surrounding the socket, the flexure member having a central opening with symmetrically spaced resilient flexure elements therein for frictionally gripping and centering a drive spindle therebetween.

2. A disk cartridge according to claim 1, wherein said housing has a head access opening for receiving a read/write head, said access opening having a normally closed door; and
   means on said door for opening the door when the cartridge is inserted in a drive unit.

3. A disk cartridge according to claim 2, wherein said housing has a cam receiving opening, said door having follower means for engagement by a cam inserted through the cam receiving opening to open the door, and bias means for closing the door when the cam is disengaged.

4. A disk cartridge according to claim 3, wherein said housing has an internal baffle sealing the portion of the housing containing the disk from contamination through said cam receiving opening.

5. A disk cartridge according to claim 1, and including a guide member secured on said one face over said flexure member, with a convergent opening therein to guide a drive spindle into the flexure member.

6. A disk cartridge according to claim 5, wherein said hub has a magnetically permeable drive ring surrounding said guide member for engagement by magnetic drive means on the drive spindle.

7. A disk cartridge according to claim 6, and including a freely rotatable bearing mounted axially on the other face of the hub, and a compression spring between said bearing and the housing biasing said one face of the hub against the inner periphery of the hub access opening.

8. A disk cartridge according to claim 1, and including spring means in said housing biasing said hub against the interior periphery of the hub access opening to seal the housing against contamination, the hub being lifted clear of the opening by insertion of the drive spindle.

9. A disk cartridge according to claim 1, wherein said hub access opening has an internal peripheral lip, said one face of said hub having a peripheral surface engageable with said lip to seal the interior of the housing against contamination;
   a spring mounted between the housing and the opposite face of said hub and holding the hub in sealed contact with the lip, and a freely rotatable bearing between the spring and hub to allow rotation of the disk by the drive means, the hub being lifted clear of the lip by insertion of the drive spindle.

10. A disk cartridge according to claim 1, wherein said self-centering means includes an axial socket in said hub for receiving a drive spindle, a flexure member secured over said socket and having a centering opening slightly smaller than the drive spindle to be received, the centering opening having symmetrically spaced linear edge portions, said flexure member having slots therein parallel to and spaced outwardly from said linear edge portions, so providing resilient flexure elements for frictionally gripping and centering a drive spindle therebetween.

* * * * *